| (12) | United States Patent | (10) Patent No.: | US 9,217,858 B2 |
|---|---|---|---|
| | Hwang et al. | (45) Date of Patent: | Dec. 22, 2015 |

(54) DISPLAY SUBSTRATE HAVING SUB PIXEL ELECTRODES CONNECTED WITH THIN FILM TRANSISTORS, METHOD OF MANUFACTURING THE SAME, AND DISPLAY APPARATUS HAVING THE SAME

(75) Inventors: Tae-Hyung Hwang, Seoul (KR); Joo-Han Bae, Seongnam-si (KR); Joon-Youp Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 214 days.

(21) Appl. No.: 13/470,024

(22) Filed: May 11, 2012

(65) Prior Publication Data

US 2013/0083390 A1 Apr. 4, 2013

(30) Foreign Application Priority Data

Sep. 29, 2011 (KR) .................. 10-2011-0099111

(51) Int. Cl.
*G02F 1/1343* (2006.01)
*G02B 26/02* (2006.01)
*G02F 1/1335* (2006.01)
*G02F 1/167* (2006.01)
*G02F 1/1362* (2006.01)

(52) U.S. Cl.
CPC ............ *G02B 26/026* (2013.01); *G02F 1/1362* (2013.01); *G02F 1/133514* (2013.01); *G02F 1/167* (2013.01); *G02F 2001/134345* (2013.01); *G02F 2001/1676* (2013.01)

(58) Field of Classification Search
CPC .............. G02F 1/133514; G02F 2011/134345; G02F 2001/134345
USPC .................. 349/104, 106, 139–140, 142, 144
See application file for complete search history.

(56) References Cited

U.S. PATENT DOCUMENTS

| 7,936,407 | B2 * | 5/2011 | Kim et al. ........................ 349/39 |
| 8,279,361 | B2 * | 10/2012 | Chen et al. ...................... 349/12 |
| 2010/0244035 | A1 * | 9/2010 | Lee et al. ......................... 257/59 |
| 2012/0218622 | A1 * | 8/2012 | Bae et al. ....................... 359/296 |

FOREIGN PATENT DOCUMENTS

| JP | 11-237628 | 8/1999 |
| KR | 10-2011-0004702 | 1/2011 |
| KR | 10-2011-0025538 | 3/2011 |

* cited by examiner

*Primary Examiner* — Matthew E Warren
(74) *Attorney, Agent, or Firm* — H.C. Park & Associates, PLC

(57) ABSTRACT

A display substrate including a base substrate, a plurality of pixel electrodes and a plurality of sub pixel electrodes. The pixel electrodes are formed on the base substrate, are spaced apart from each other, and are electrically connected with a plurality of transistors, respectively. The sub pixel electrodes are disposed between the pixel electrodes, and are electrically connected with a thin-film transistor (TFT). Thus, quality of an image displayed by the display apparatus may be enhanced.

12 Claims, 8 Drawing Sheets

DISPLAY SUBSTRATE HAVING SUB PIXEL ELECTRODES CONNECTED WITH THIN FILM TRANSISTORS, METHOD OF MANUFACTURING THE SAME, AND DISPLAY APPARATUS HAVING THE SAME

CROSS-REFERENCE TO RELATED APPLICATION

This application claims priority from and the benefit of Korean Patent Application No. 10-2011-0099111, filed on Sep. 29, 2011, which is hereby incorporated by reference for all purposes as if fully set forth herein.

BACKGROUND

1. Field

Exemplary embodiments of the present invention relate to a display substrate, a method of manufacturing the display substrate and a display apparatus having the display substrate. More particularly, exemplary embodiments of the present invention relate to a display substrate of a reflective type, a method of manufacturing the display substrate and a display apparatus having the display substrate.

2. Discussion of the Background

A reflective type display apparatus uses an external light incident from an outside instead of a backlight, and, thus, the reflective type display apparatus may decrease power consumption. In addition, in the reflective type display apparatus, the external light passes through a color filter layer and is reflected from a reflection layer to display an image.

However, when distances between a red color filter, a green color filter and a blue color filter in the color filter layer are relatively small, the external light passing through the red color filter and reflected from the reflection layer may pass through the green color filter. In addition, the external light passing through the green color filter and reflected from the reflection layer may pass through the blue color filter. In addition, the external light passing through the blue color filter and reflected from the reflection layer may pass through the red color filter. Thus, colors may be mixed and color reproducibility may decrease.

A blocking portion may be formed between the red color filter, the green color filter and the blue color filter to prevent the mixing of colors, and a brightness of the reflective type display apparatus may decrease. Thus, the quality of an image displayed by the reflective type display apparatus may also decrease.

SUMMARY OF THE INVENTION

Exemplary embodiments of the present invention provide a display substrate having improved image quality.

Exemplary embodiments of the present invention also provide a method of manufacturing the above-mentioned display substrate.

Exemplary embodiments of the present invention also provide a display apparatus having the above-mentioned display substrate.

Additional features of the invention will be set forth in the description which follows, and in part will be apparent from the description, or may be learned by practice of the invention.

An exemplary embodiment of the present invention discloses a display substrate including a base substrate, a plurality of pixel electrodes and a plurality of sub pixel electrodes. The pixel electrodes are formed on the base substrate, are spaced apart from each other, and are electrically connected with a plurality of transistors, respectively. The sub pixel electrodes are disposed between the pixel electrodes, and are electrically connected with a thin-film transistor (TFT).

Another exemplary embodiment of the present invention also discloses a display apparatus including a display substrate, an opposite substrate and a reflection layer. The display substrate includes a first base substrate, a plurality of pixel electrodes formed on the first base substrate, spaced apart from each other and electrically connected with a plurality of transistors respectively, and a plurality of sub pixel electrodes disposed between the pixel electrodes and electrically connected with a TFT. The opposite substrate includes a second base substrate and a color filter. The second substrate faces the first base substrate. The color filter layer includes color filters and opening portions. The color filters are formed on the second base substrate, correspond to the pixel electrodes and are spaced apart from each other. The opening portions correspond to the sub pixel electrodes, are disposed between the color filters, and light passes through the opening portions due to a driving of the TFT electrically connected with the sub pixel electrodes. The reflection layer is formed between the display substrate and the opposite substrate, and reflects the light passing through the opposite substrate into the opening portions using a voltage applied to the sub pixel electrodes so as to display an image.

An example exemplary embodiment of the present invention also discloses a method of manufacturing a display substrate. In the method, a plurality of transistors connected to a plurality of data lines and a plurality of gate lines, and formed on a base substrate, are formed. A plurality of pixel electrodes spaced apart from each other, and a plurality of sub pixel electrodes disposed between the pixel electrodes and electrically connected with a TFT are formed on the base substrate on which the transistors are formed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
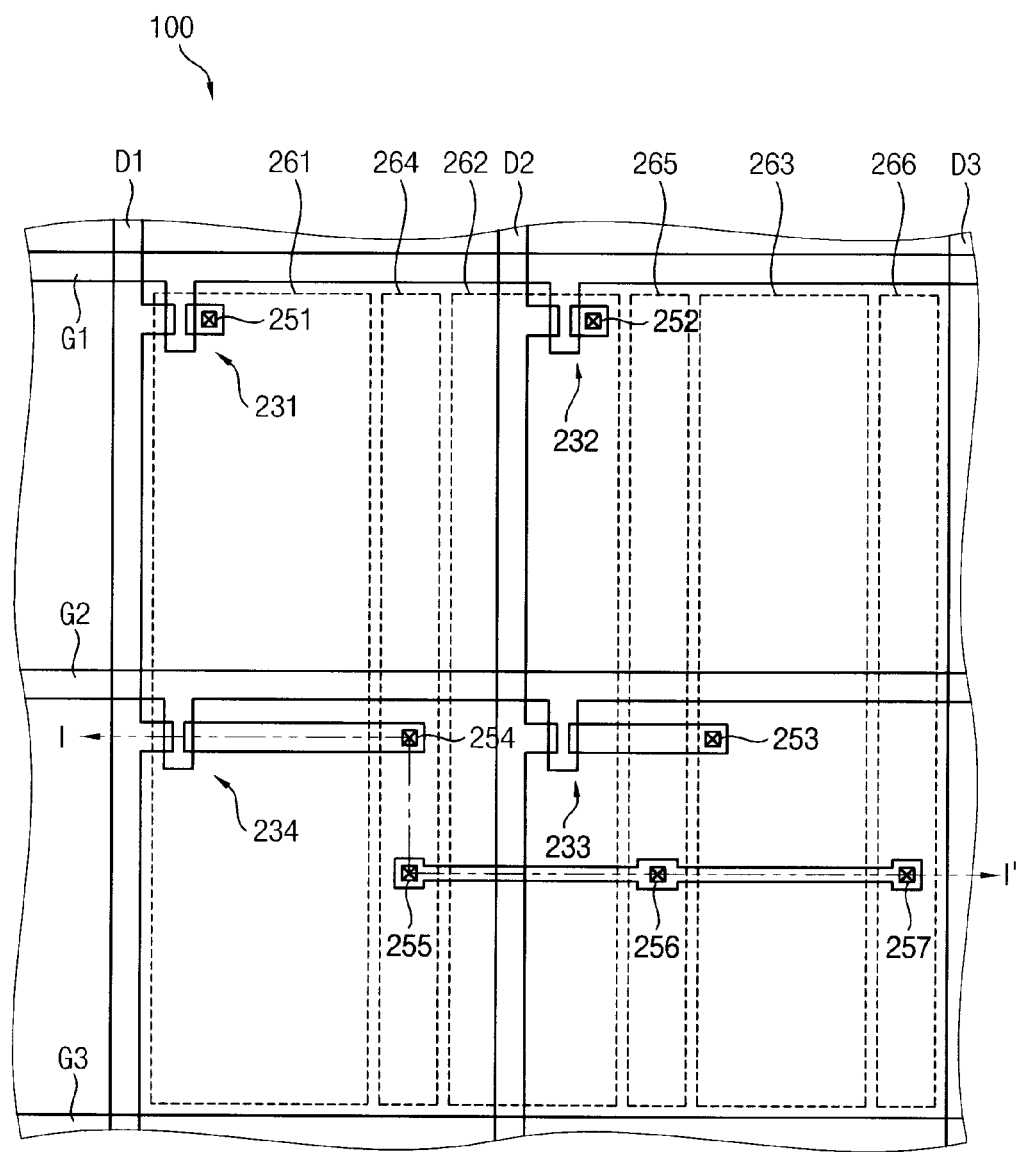
FIG. 1 is a plan view illustrating a display apparatus according to a first exemplary embodiment of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
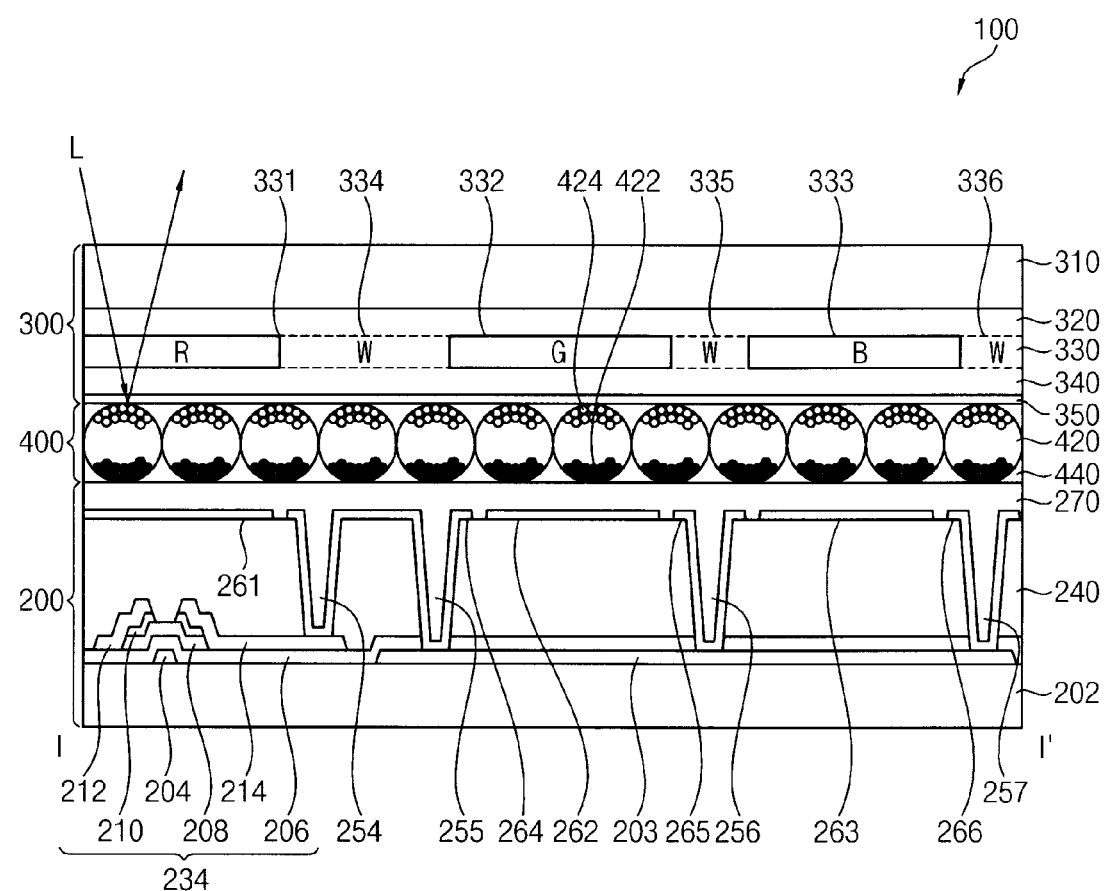
FIG. 2 is a cross-sectional view taken along a line I-I' of FIG. 1.

FIG. 1 is a plan view illustrating a display apparatus according to an first exemplary embodiment of the present invention, and FIG. 2 is a cross-sectional view taken along a line I-I' of FIG. 1.

Referring to FIGS. 1 and 2, the display apparatus 100 according to the first exemplary embodiment includes a display substrate 200, an opposite substrate 300 and a reflection layer 400.

The display substrate 200 includes a first base substrate 202, a first gate line G1, a second gate line G2, a third gate line G3, a first data line D1, a second data line D2, a third data line D3, a plurality of transistors 231, 232 and 233, a thin-film transistor (TFT) 234, an organic insulating layer 240, pixel electrodes 261, 262 and 263, sub pixel electrodes 264, 265 and 266, and a first adhesive layer 270.

The first base substrate 202 may include glass material or plastic material.

The first gate line G1, the second gate line G2 and the third gate line G3 are formed on the first base substrate 202, extend in a first direction DR1, and are spaced apart from each other in a second direction DR2 substantially perpendicular to the first direction DR1.

The first data line D1, the second data line D2 and the third data line D3 are insulated from the first gate line G1, the second gate line G2 and the third gate line G3, extend in the second direction DR2, and are spaced apart from each other in the first direction DR1.

The transistors 231, 232 and 233 include a first transistor 231, a second transistor 232 and a third transistor 233.

The first transistor 231 is formed on the first base substrate 202 and is electrically connected with the first gate line G1 and the first data line D1. For example, the first transistor 231 includes a first gate electrode extended from the first gate line G1, a gate insulating layer 206 formed on the first gate electrode, a first active layer formed on the gate insulating layer 206, a first ohmic-contact layer separately formed on the first active layer, a first source electrode formed on the first ohmic-contact layer and extended from the first data line D1, and a first drain electrode formed on the first ohmic-contact layer and spaced apart from the first source electrode.

The second transistor 232 is formed on the first base substrate 202 and is electrically connected with the first gate line G1 and the second data line D2. For example, the second transistor 232 includes a second gate electrode extended from the first gate line G1, the gate insulating layer 206 formed on the second gate electrode, a second active layer formed on the gate insulating layer 206, a second ohmic-contact layer separately formed on the second active layer, a second source electrode formed on the second ohmic-contact layer and extended from the second data line D2, and a second drain electrode formed on the second ohmic-contact layer and spaced apart from the second source electrode.

The third transistor 233 is formed on the first base substrate 202 and is electrically connected with the second gate line G2 and the second data line D2. For example, the third transistor 233 includes a third gate electrode extended from the second gate line G2, the gate insulating layer 206 formed on the third gate electrode, a third active layer formed on the gate insulating layer 206, a third ohmic-contact layer separately formed on the third active layer, a third source electrode formed on the third ohmic-contact layer and extended from the second data line D2, and a third drain electrode formed on the third ohmic-contact layer and spaced apart from the third source electrode.

The TFT 234 is formed on the first base substrate 202 and is electrically connected with the second gate line G2 and the first data line D1. For example, the TFT 234 includes a fourth gate electrode 204 extended from the second gate line G2, the gate insulating layer 206 formed on the fourth gate electrode 204, a fourth active layer 208 formed on the gate insulating layer 206, a fourth ohmic-contact layer 210 separately formed on the fourth active layer 208, a fourth source electrode 212 formed on the fourth ohmic-contact layer 210 and extended from the first data line D1, and a fourth drain electrode 214 formed on the fourth ohmic-contact layer 210 and spaced apart from the fourth source electrode 212.

The organic insulating layer 240 is formed on the first transistor 231, the second transistor 232, the third transistor 233 and the TFT 234 to protect the first transistor 231, the second transistor 232, the third transistor 233 and the TFT 234.

The pixel electrodes 261, 262 and 263 are formed on the organic insulating layer 240 and are spaced apart from each other, and the sub pixel electrodes 264, 265 and 266 are disposed between the pixel electrodes 261, 262 and 263.

The pixel electrodes 261, 262 and 263 include a first pixel electrode 261, a second pixel electrode 262 and a third pixel electrode 263, and the sub pixel electrodes 264, 265 and 266 include a first sub pixel electrode 264, a second sub pixel electrode 265 and a third sub pixel electrode 266. For example, the first sub pixel electrode 264 is disposed between the first and second pixel electrodes 261 and 262, the second sub pixel electrode 265 is disposed between the second and third pixel electrodes 262 and 263, and the third sub pixel electrode 266 is disposed between the third pixel electrode 263 and a fourth pixel electrode (not shown).

Each of the first pixel electrode 261, the second pixel electrode 262, the third pixel electrode 263, the first sub pixel electrode 264, the second sub pixel electrode 265 and the third sub pixel electrode 266 has a stripe shape of which a first length substantially parallel with the first direction DR1 is shorter than a second length substantially parallel with the second direction DR2, and the first pixel electrode 261, the second pixel electrode 262, the third pixel electrode 263, the first sub pixel electrode 264, the second sub pixel electrode 265 and the third sub pixel electrode 266 are repeatedly formed along the first direction DR1. In addition, the first pixel electrode 261, the second pixel electrode 262, the third pixel electrode 263, the first sub pixel electrode 264, the second sub pixel electrode 265 and the third sub pixel electrode 266 may be formed in a unit pixel area surrounded by the first gate line G1, the third gate line G3, the first data line D1 and the third data line D3.

Each of the first pixel electrode 261, the second pixel electrode 262, the third pixel electrode 263, the first sub pixel electrode 264, the second sub pixel electrode 265 and the third sub pixel electrode 266 may include indium tin oxide (ITO) material or indium zinc oxide (IZO).

The first pixel electrode 261 is formed on the organic insulating layer 240 and is electrically connected with the first drain electrode of the first transistor 231 through a first contact hole 251 formed through the organic insulating layer 240.

The second pixel electrode 262 is formed on the organic insulating layer 240, is spaced apart from the first pixel electrode 261, and is electrically connected with the second drain electrode of the second transistor 232 through a second contact hole 252 formed through the organic insulating layer 240.

The third pixel electrode 263 is formed on the organic insulating layer 240, is spaced apart from the second pixel electrode 262, and is electrically connected with the third drain electrode of the third transistor 233 through a third contact hole 253 formed through the organic insulating layer 240.

The first sub pixel electrode 264 is formed between the first pixel electrode 261 and the second pixel electrode 262 on the organic insulating layer 240, and is electrically connected with the fourth drain electrode 214 of the TFT 234 through a fourth contact hole 254 formed through the organic insulating layer 240.

The second sub pixel electrode 265 is formed between the second pixel electrode 262 and the third pixel electrode 263, and the third sub pixel electrode 266 is formed between the third pixel electrode 263 and a fourth pixel electrode. The fourth pixel electrode may be substantially the same as the first pixel electrode 261 and adjacent to the third pixel electrode 263.

The sub pixel electrodes 264, 265 and 266 are electrically connected with each other through a connection electrode 203. For example, the connection electrode 203 may be a gate metal layer forming the fourth gate electrode 204.

For example, the first sub pixel electrode 264 is electrically connected with the connection electrode 203 through a fifth contact hole 255 formed through the organic insulating layer 240, the second sub pixel electrode 265 is electrically connected with the connection electrode 203 through a sixth contact hole 256 formed through the organic insulating layer 240, and the third sub pixel electrode 266 is electrically connected with the connection electrode 203 through a seventh contact hole 257 formed through the organic insulating layer 240. Thus, the sub pixel electrodes 264, 265 and 266 are electrically connected with the TFT 234, and a data voltage may be applied to the sub pixel electrodes 264, 265 and 266 due to a driving of the TFT 234 regardless of the pixel electrodes 261, 262 and 263.

The first adhesive layer 270 is formed on the first pixel electrode 261, the second pixel electrode 262, the third pixel electrode 263, the first sub pixel electrode 264, the second sub pixel electrode 265 and the third sub pixel electrode 266, to combine the display substrate 200 with the reflection layer 400.

The opposite substrate 300 includes a second base substrate 310, a second adhesive layer 320, a color filter layer 330, a polymer layer 340 and a common electrode 350.

The second base substrate 310 faces the first base substrate 202. The second base substrate 310 may include a glass material or a plastic material.

The second adhesive layer 320 is formed between the second base substrate 310 and the color filter layer 330, to combine the second base substrate 310 with the color filter layer 330 and to protect the second base substrate 320. For example, the second adhesive layer 320 may include an optically clear adhesive (OCA).

The color filter layer 330 is formed on the second adhesive layer 320, and includes color filters 331, 332 and 333 spaced apart from each other and opening portions 334, 335 and 336 disposed between the color filters 331, 332 and 333.

The color filters 331, 332 and 333 include a first color filter 331, a second color filter 332 and a third color filter 333 spaced apart from each other. For example, the first color filter 331, the second color filter and the third color filter 333 may be a red color filter, a green color filter and a blue color filter, respectively.

The opening portions 334, 335 and 336 include a first opening portion 334, a second opening portion 335 and a third opening portion 336. The first opening portion 334 is disposed between the first color filter 331 and the second color filter 332, the second opening portion 335 is disposed between the second color filter 332 and the third color filter 333, and the third opening portion 336 is disposed between the third color filter 333 and a fourth color filter. The fourth color filter may be substantially the same as the first color filter 331 and adjacent to the third color filter 333.

The first color filter 331 corresponds to the first pixel electrode 261, the second color filter 332 corresponds to the second pixel electrode 262, and the third color filter 333 corresponds to the third pixel electrode 263. In addition, the first opening portion 334 corresponds to the first sub pixel electrode 264, the second opening portion 335 corresponds to the second sub pixel electrode 265, and the third opening portion 336 corresponds to the third sub pixel electrode 266. Thus, each of the first color filter 331, the first opening portion 334, the second color filter 332, the second opening portion 335, the third color filter 333 and the third opening portion 336 may have a stripe shape.

The polymer layer 340 is formed on the color filter layer 330, and the common electrode 350 is formed on the polymer layer 340. The common electrode 350 may be prevented from being twisted by the polymer layer 340. For example, the polymer layer 340 may include polyethylene terephthalate (PET) material, and the common electrode 350 may include ITO material or IZO material.

The reflection layer 400 is formed between the display substrate 200 and the opposite substrate 300, and reflects light L incident from an outside of the opposite substrate 300 and passing through the opposite substrate 300. For example, the reflection layer 400 may be an electrophoretic layer.

The reflection layer 400 displays an image using an electric field generated between the pixel electrodes 261, 262 and 263, the sub pixel electrodes 264, 265 and 266 of the display substrate 200 and the common electrode 350 of the opposite substrate 300.

The reflection layer 400 includes a microcapsule 420 and a binder 440. The microcapsule 420 includes a black particle 422 charged with a negative (−) charge and a white particle 424 charged with a positive (+) charge. Thus, the black particle 422 responds to a positive voltage and the white particle 424 responds to a negative voltage. The black particle 422 may include a carbon material, and the white particle 424 may include a titanium dioxide (TiO2) material. The binder 440 protects and fixes the microcapsule 420.

When the electric field is not generated between the pixel electrodes 261, 262 and 263, the sub pixel electrodes 264, 265 and 266 of the display substrate 200 and the common electrode 350 of the opposite substrate 300, the black particle 422 and the white particle 424 are irregularly disposed in the microcapsule 420.

When a data voltage higher than a common voltage applied to the common electrode 350 is applied to the pixel electrodes 261, 262 and 263 and the sub pixel electrodes 264, 265 and 266, the black particle 422 charged with the negative charge drifts toward the pixel electrodes 261, 262 and 263 and the sub pixel electrodes 264, 265 and 266, and the white particle 424 charged with the positive charge drifts toward the common electrode 350. In this case, the data voltage may be a positive voltage. Thus, when a positive electric field is generated between the pixel electrodes 261, 262 and 263, the sub pixel electrodes 264, 265 and 266 and the common electrode 350, the light L passing through the opposite substrate 300 is reflected by the white particle 424, and thus the display apparatus 100 displays an image using red light passing through the first color filter 331, green light passing through the second color filter 332, blue light passing through the third color filter 333, and light passing through the first, second and third opening portions 334, 335 and 336. The light passing through each of the first, second and third opening portions 334, 335 and 336 may be white light.

When a data voltage lower than the common voltage applied to the common electrode 350 is applied to the pixel electrodes 261, 262 and 263 and the sub pixel electrodes 264, 265 and 266, the white particle 424 charged with the positive charge drifts toward the pixel electrodes 261, 262 and 263 and the sub pixel electrodes 264, 265 and 266 and the black particle 422 charged with the negative charge drifts toward the common electrode 350. In this case, the data voltage may be a negative voltage. Thus, when a negative electric field is generated between the pixel electrodes 261, 262 and 263, the sub pixel electrodes 264, 265 and 266 and the common electrode 350, the light passing through the opposite substrate 300 is absorbed by the black particle 422, and thus the display apparatus 100 displays an image having a black grayscale.

The reflection layer 400 may selectively reflect the light L toward the first, second and third opening portions 334, 335 and 336.

Figure 3A:
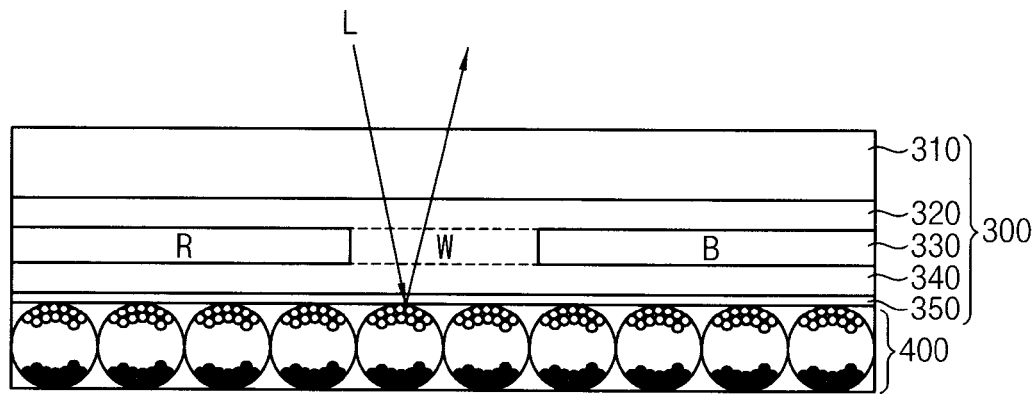
FIG. 3A and FIG. 3B are conceptual diagrams illustrating a method of selectively reflecting the light toward the first, second and third opening portions.
Figure 3B:
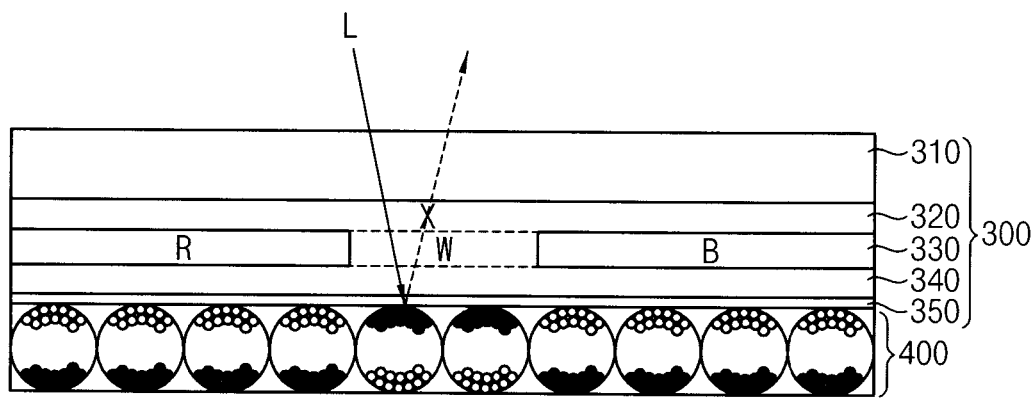

FIGS. 3A and 3B are conceptual diagrams illustrating a method of selectively reflecting the light L toward the first, second and third opening portions 334, 335 and 336.

Referring to FIGS. 2 and 3A, when the display apparatus 100 displays the image using the light L, the light L may pass through the first opening portion 334. The light L passing through the first opening portion 334 may be white light, and the white light may pass through the first opening portion 334 according to a white light extraction algorithm.

A pixel voltage may be applied to the first sub pixel electrode 264 due to the driving of the TFT 234 regardless of the first, second and third pixel electrodes 261, 262 and 263. The pixel voltage applied to the first sub pixel electrode 264 may be greater than the common voltage applied to the common electrode 350. Thus, the reflective layer 400 may reflect the light L passing through the first opening portion 334 toward the first opening portion 334 regardless of the red light passing through the first color filter 331, the green light passing through the second color filter 332 and the blue light passing through the third color filter 333. Thus, the light L incident to the reflection layer 400 may pass through the first opening portion 334.

In addition, the second sub pixel electrode 265 and the third sub pixel electrode 266 are electrically connected with the TFT 234 through the connection electrode 203, and thus the pixel voltage may be applied to the second sub pixel electrode 265 and the third sub pixel electrode 266 due to the driving of the TFT 234 regardless of the first, second and third pixel electrodes 261, 262 and 263. The pixel voltage applied to the second sub pixel electrode 265 and the third sub pixel electrode 266 may be greater than the common voltage applied to the common electrode 350. Thus, the reflective layer 400 may reflect the light L passing through the second opening portion 335 and the third opening portion 336 toward the second opening portion 335 and the third opening portion 336, regardless of the red light passing through the first color filter 331, the green light passing through the second color filter 332 and the blue light passing through the third color filter 333. Thus, the light L may pass through the second opening portion 335 and the third opening portion 336.

Referring to FIGS. 2 and 3B, when the display apparatus 100 displays the image without the light L, the light L may not pass through the first opening portion 334.

The pixel voltage may be applied to the first sub pixel electrode 264 due to the driving of the TFT 234 regardless of the first, second and third pixel electrodes 261, 262 and 263. The pixel voltage applied to the first sub pixel electrode 264 may be less than the common voltage applied to the common electrode 350. Thus, the reflective layer 400 may absorb the light L passing through the first opening portion 334 regardless of the red light passing through the first color filter 331, the green light passing through the second color filter 332 and the blue light passing through the third color filter 333. Thus, the light L incident to the reflection layer 400 may not pass through the first opening portion 334.

In addition, the second sub pixel electrode 265 and the third sub pixel electrode 266 are electrically connected with the TFT 234 through the connection electrode 203, and thus the pixel voltage may be applied to the second sub pixel electrode 265 and the third sub pixel electrode 266 due to the driving of the TFT 234 regardless of the first, second and third pixel electrodes 261, 262 and 263. The pixel voltage applied to the second sub pixel electrode 265 and the third sub pixel electrode 266 may be less than the common voltage applied to the common electrode 350. Thus, the reflective layer 400 may absorb the light L passing through the second opening portion 335 and the third opening portion 336 regardless of the red light passing through the first color filter 331, the green light passing through the second color filter 332 and the blue light passing through the third color filter 333. Thus, the light L incident to the reflection layer 400 may not pass through the second opening portion 335 and the third opening portion 336.

The red light passing through the first color filter 331 and reflected from the reflection layer 400 may pass through the second color filter 332, the green light passing through the second color filter 332 and reflected from the reflection layer 400 may pass through the third color filter 333, and the blue light passing through the third color filter 333 and reflected from the reflection layer 400 may pass through the fourth color filter substantially same as the first color filter 331, according to widths of the first, second and third opening portions 334, 335 and 336. Thus, colors may be mixed and a color reproducibility rate may decrease.

Figure 4:
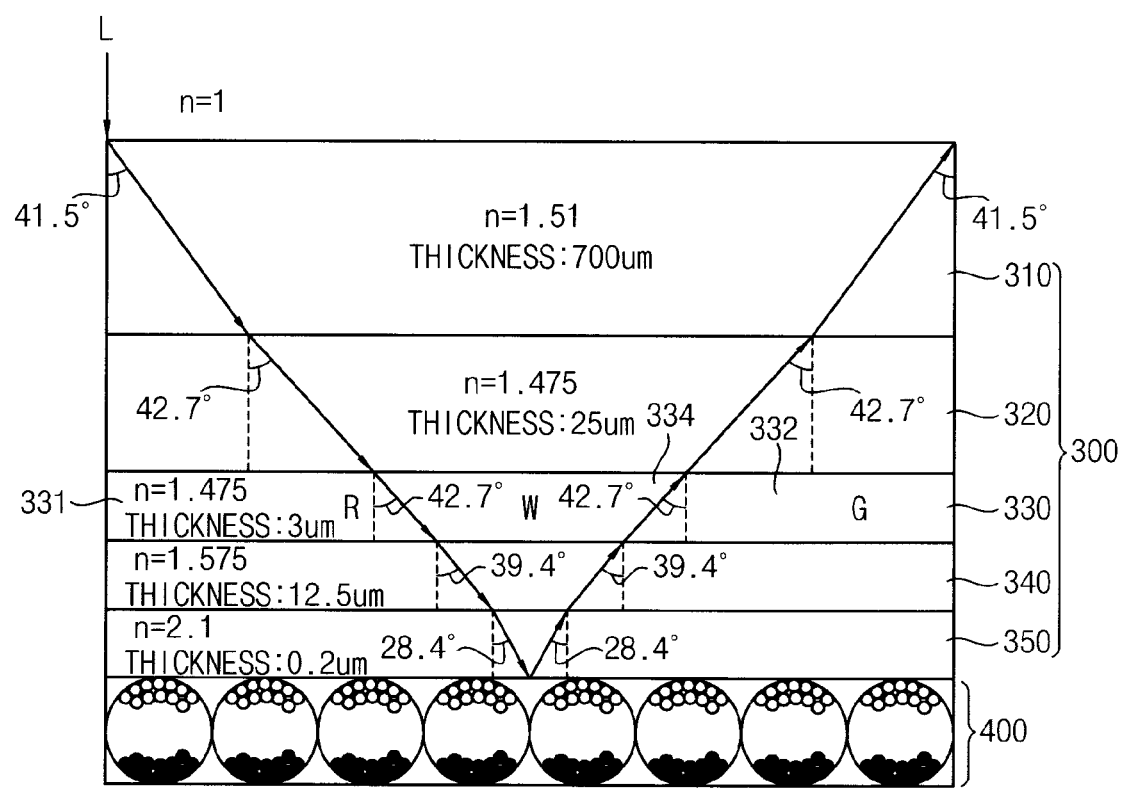
FIG. 4 is a conceptual diagram calculating widths of the first, second and third opening portions in FIG. 2.

FIG. 4 is a conceptual diagram calculating widths of the first, second and third opening portions 334, 335 and 336 in FIG. 2.

Referring to FIGS. 2 and 4, a refractive index of the air outside of the opposite substrate 300 may be about 1, a refractive index of the second base substrate 310 may be about 1.51, and a thickness of the second base substrate 310 may be about 700 μm. A refractive index of the second adhesive layer 320 may be about 1.475 and a thickness of the second adhesive layer 320 may be about 25 μm. A refractive index of the color filter layer 330 may be about 1.475 and a thickness of the color filter layer 330 may be about 3 μm. A refractive index of the polymer layer 340 may be about 1.575 and a thickness of the polymer layer 340 may be about 12.5 μm. A refractive index of the common electrode 350 may be about 2.1 and a thickness of the common electrode 350 may be about 0.2 μm.

A width of the first opening portion 334 preventing the mixing of colors may be calculated according to a refractive index and a thickness of a material in the opposite substrate 300. Thus, the width of the first opening portion 334 may be calculated according to the refractive indexes and the thicknesses of the second base substrate 310, the second adhesive layer 320, the color filter layer 330, the polymer layer 340 and the common electrode 350.

The light L incident to the opposite substrate 300 may be assumed to be about 90 degrees with respect to an upper surface of the opposite substrate 300 to calculate a minimum width of the first opening portion 334. The width of the first opening portion 334 is calculated in a case that the light L is incident to the second base substrate 310, passes through the first opening portion 334, is reflected from the reflection layer 400, and passes through the first opening portion 334.

According to Fresnel's law, the light L incident to the second base substrate 310 from the air may be refracted at an angle of about 41.5 degrees. The light L incident to the second adhesive layer 320 from the second base substrate 310 may be refracted at an angle of about 42.7 degrees. The light L incident to the color filter layer 330 from the second adhesive layer 320 may be refracted at an angle of about 42.7 degrees. The light L incident to the polymer layer 340 from the color filter layer 330 may be refracted at an angle of about 39.4 degrees. The light L incident to the common electrode 350 from the polymer layer 340 may be refracted at an angle of about 28.4 degrees.

In addition, the light L incident to the common electrode 350 reflected from the reflection layer 400 may be refracted at an angle of about 28.4 degrees. The light L incident to the polymer layer 340 from the common electrode 350 may be refracted at an angle of about 39.4 degrees. The light L incident to the color filter layer 330 from the polymer layer 340 may be refracted at an angle of about 42.7 degrees. The light L incident to the second adhesive layer 320 from the color filter layer 330 may be refracted at an angle of about 42.7 degrees. The light L incident to the second base substrate 310 from the second adhesive layer 320 may be refracted at an angle of about 41.5 degrees.

The width of the first opening portion 334 may be 2*((0.2 μm*tan 28.4 degrees)+(12.5 μm*tan 39.4 degrees)+(3 μm*tan 42.7 degrees)). Thus, the width of the first opening portion 334 may be about 26 μm as 2*((0.2 μm*0.54)+(12.5 μm*0.82)+(3 μm*0.92)).

The refractive indexes and the thicknesses of the second base substrate 310, the second adhesive layer 320, the color filter layer 330, the polymer layer 340 and the common electrode 350 may have a deviation, and thus the width of the first opening portion 334 may be between about 21 and about 30 μm.

A width of the second opening portion 335 and a width of the third opening portion 336 may be calculated in the same manner as the width of the first opening portion 334.

Thus, when the width of each of the first, second and third opening portions 334, 335 and 336 is between about 21 and about 30 μm, the mixing of colors may decrease and the color reproducibility rate may increase.

In the present exemplary embodiment, the reflection layer 400 may be, but is not limited to, an electrophoretic layer, and the reflection layer 400 may be an electro-wetting layer including an oil material such that the light L is reflected due to contracting or spreading of the oil material according to the pixel voltage applied to the pixel electrodes 261, 262 and 263 and the sub pixel electrodes 264, 265 and 266 and the common voltage applied to the common electrode 350.

Figure 5:
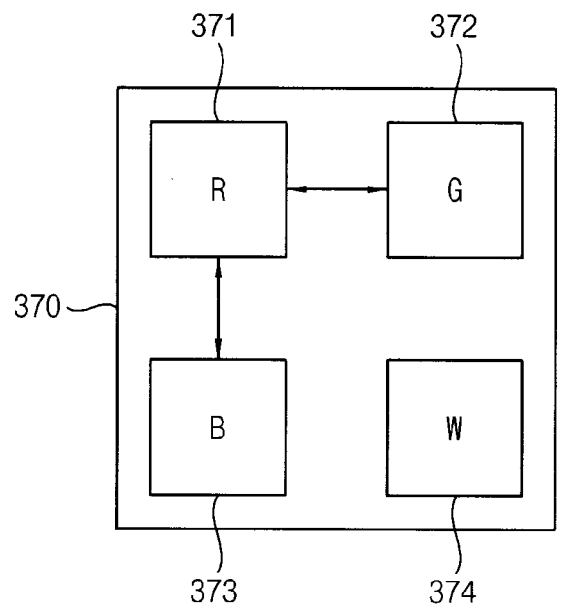
FIG. 5 is a plan view illustrating a unit pixel including color filters having a dot shape according to a comparative example embodiment.

FIG. 5 is a plan view illustrating a unit pixel including color filters having a dot shape according to a comparative example embodiment.

Referring to FIG. 5, each of a first color filter 371, a second color filter 372, a third color filter 373, and a fourth color filter 374 has a dot shape and are disposed in a quad shape in the unit pixel 370. Thus, the first color filter 371, the second color filer 372, the third color filter 373 and the fourth color filter 374 are spaced apart from each other in a horizontal direction and a vertical direction.

Figure 6:
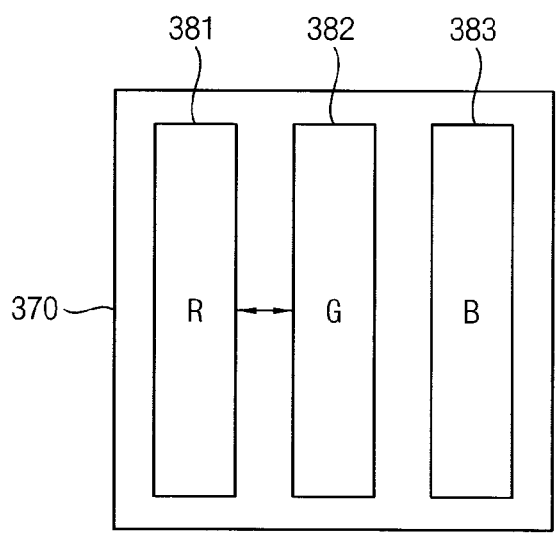
FIG. 6 is a plan view illustrating a unit pixel including color filters having a stripe shape.

FIG. 6 is a plan view illustrating a unit pixel including color filters having a stripe shape.

Referring to FIG. 6, a first color filter 381, a second color filter 382 and a third color filter 383 are disposed in a stripe shape. Thus, the first color filter 381, the second color filter 382 and the third color filter 383 are spaced apart from each other in a horizontal direction.

Figure 7:
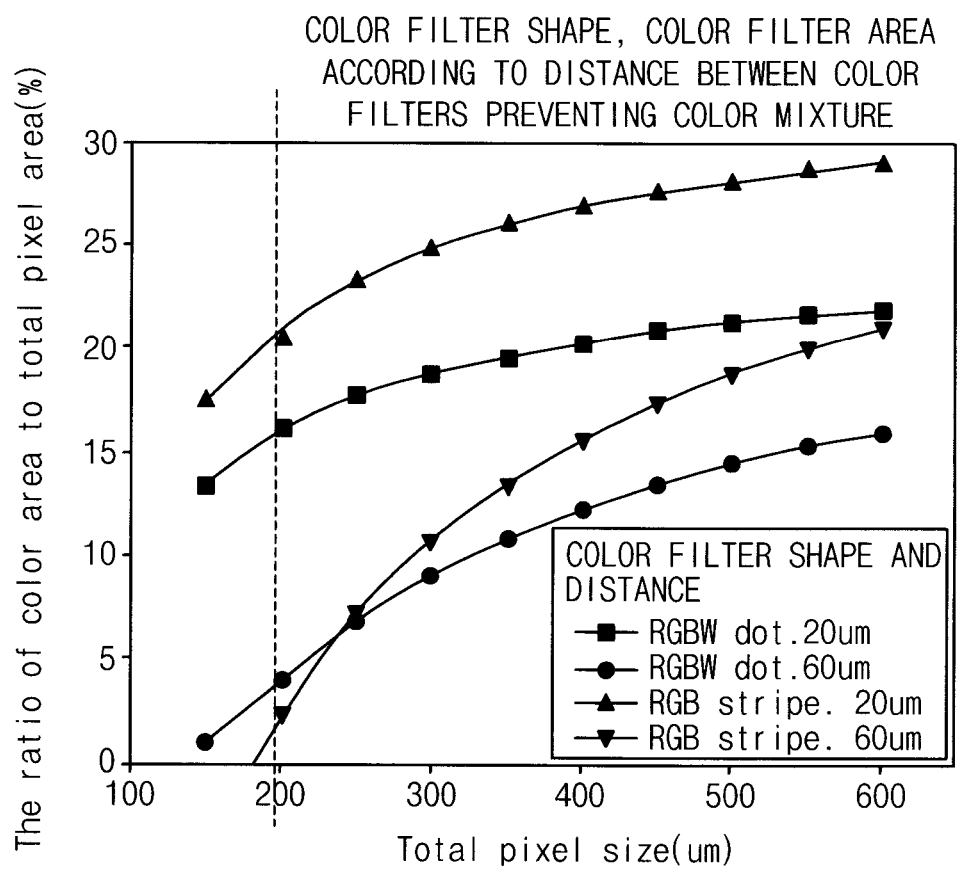
FIG. 7 is a graph illustrating a ratio of the color filters with respect to the unit pixel in FIGS. 5 and 6.

FIG. 7 is a graph illustrating a ratio of the color area of the filters to the total pixel area with respect to the unit pixel in FIGS. 5 and 6.

Referring to FIGS. 5 to 7, when the first color filter 381, the second color filter 382 and the third color filter 383 are disposed in a stripe shape with a distance between them of about 20 μm, the ratio of the color area of the color filters 381, 382 and 383 with respect to the total pixel area for the unit pixel 370 is greatest.

Thus, when the first color filter 331, the second color filter 332 and the third color filter 333 in FIG. 2 are disposed in a stripe shape, a color area of each of the first color filter 331, the second color filter 332 and the third color filter 333 may be larger, compared to the situation of the first color filter 331, the second color filter 332 and the third color filter 333 being disposed in a quad shape.

Figure 8A:
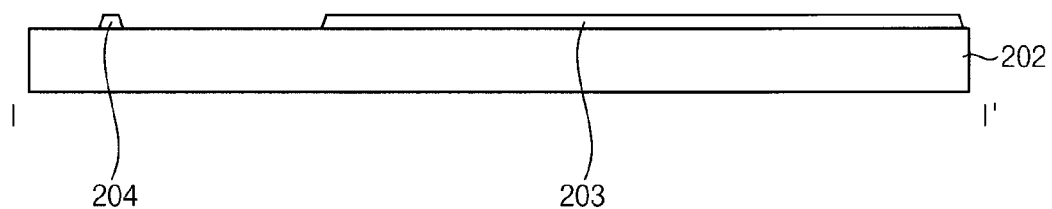
FIG. 8A, FIG. 8B, and FIG. 8C are cross-sectional views illustrating a method of manufacturing the display substrate in FIGS. 1 and 2 according to a second exemplary embodiment of the present invention.
Figure 8B:
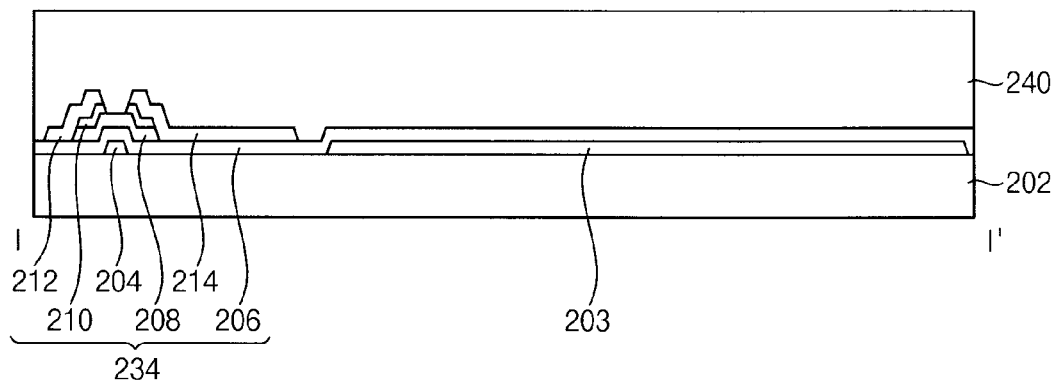
Figure 8C:
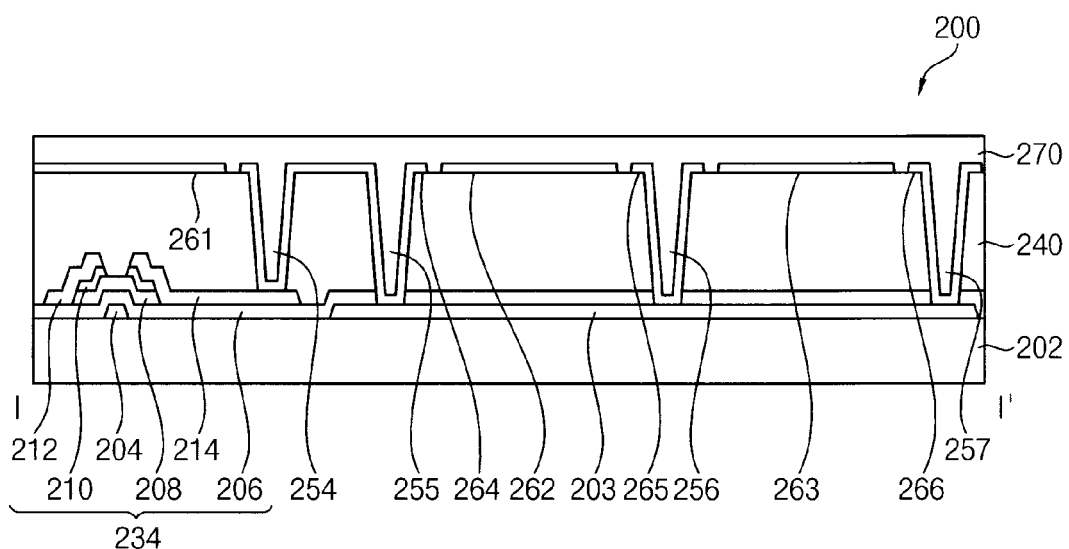

FIGS. 8A, 8A and 8C are cross-sectional views illustrating a method of manufacturing the display substrate 200 in FIGS. 1 and 2.

Referring to FIG. 8A, the connection electrode 203 and the fourth gate electrode 204 of TFT 234 are formed on the first base substrate 202. Although not shown in figures, the first gate electrode of the first transistor 231, the second gate electrode of the second transistor 232 and the third gate electrode of the third transistor 233 are formed on the first base substrate 202 in the same manner as the fourth gate electrode 204 of the TFT 234.

Referring to FIG. 8B, the gate insulating layer 206 is formed on the fourth gate electrode 204 and the connection electrode 203. The fourth active layer 208, the fourth ohmic-contact layer 210, the fourth source electrode 212 and the fourth drain electrode 214 are formed on the gate insulating layer 206 to form the TFT 234. Although not shown in figures, the first transistor 231, the second transistor 232 and the third transistor 233 are formed in the same manner as the TFT 234.

The organic insulating layer 240 is formed on the first transistor 231, the second transistor 232, the third transistor 233 and the TFT 234.

Referring to FIG. 8C, the pixel electrodes 261, 262 and 263 and the sub pixel electrodes 264, 265 and 266 are formed on the organic insulating layer 240. For example, the first pixel electrode 261, the second pixel electrode 262 and the third pixel electrode 263 are formed so as to be spaced apart from each other. The first sub pixel electrode 264 is formed between the first pixel electrode 261 and the second pixel electrode 262, the second sub pixel electrode 265 is formed between the second pixel electrode 262 and the third pixel electrode 263, and the third sub pixel electrode 266 is formed between the third pixel electrode 263 and the fourth pixel electrode. The fourth pixel electrode is substantially the same as the first pixel electrode 261 and adjacent to the third pixel electrode 263.

The first sub pixel electrode 264 is electrically connected with the fourth drain electrode 214 of the TFT 234 through the fourth contact hole 254 formed through the organic insulating layer 240.

The first sub pixel electrode 264, the second sub pixel electrode 265 and the third sub pixel electrode 266 are electrically connected with each other. For example, the first sub pixel electrode 264 is electrically connected with the connection electrode 203 through the fifth contact hole 255 formed through the organic insulating layer 240; the second sub pixel electrode 265 is electrically connected with the connection electrode 203 through the sixth contact hole 256 formed through the organic insulating layer 240; and the third sub pixel electrode 266 is electrically connected with the connection electrode 203 through the seventh contact hole 257 formed through the organic insulating layer 240.

The first adhesive layer 270 is formed on the first pixel electrode 261, the second pixel electrode 262, the third pixel electrode 263, the first sub pixel electrode 264, the second sub pixel electrode 265 and the third sub pixel electrode 266 to form the display substrate 200.

According to the present exemplary embodiment, the first opening portion 334, the second opening portion 335 and the third opening portion 336 through which the light L passes are formed between the first color filter 331, the second color filter 332 and the third color filter 333, and, thus, the mixing of colors may be prevented and the color reproducibility rate may increase.

In addition, a light blocking portion is not formed between the first color filter 331, the second color filter 332 and the third color filter 333, and thus a reflection rate of the display apparatus 100 may increase.

According to the present invention including the display substrate, the method of manufacturing the display substrate, and the display apparatus having the display substrate, an opening portion through which light selectively passes is formed between color filters and, thus, the mixing of colors may be prevented and a color reproducibility rate may increase. In addition, a light blocking portion is not formed between the color filters, and a reflection rate of a display apparatus may increase. Thus, the quality of an image displayed by the display apparatus may be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
a display substrate comprising a first base substrate, a plurality of pixel electrodes formed on the first base substrate which are spaced apart from each other and electrically connected with a plurality of transistors respectively, and a plurality of sub pixel electrodes disposed between the pixel electrodes and electrically connected with a TFT;
an opposite substrate comprising a second base substrate and a color filter layer, the second base substrate facing the first base substrate, the color filter layer comprising color filters and opening portions, the color filters being formed on the second base substrate, corresponding to the pixel electrodes and being spaced apart from each other, the opening portions corresponding to the sub pixel electrodes and being disposed between the color filters, such that light passes through the opening portions due to a driving of the TFT electrically connected with the sub pixel electrodes;
a connection electrode disposed on the first base substrate; and
a reflection layer formed between the display substrate and the opposite substrate, and configured to reflect the light passing through the opposite substrate into the opening portions using a voltage applied to the sub pixel electrodes so as to display an image,
wherein each of the sub pixel electrodes is connected to the connection electrode through a contact hole such that the sub pixel electrodes are connected to each other only through the connection electrode.

2. The display apparatus of claim 1, wherein the reflection layer is an electrophoretic layer comprising a white particle charged with a positive charge and a black particle charged with a negative charge.

3. The display apparatus of claim 1, wherein the reflection layer is an electro-wetting layer comprising an oil material.

4. The display apparatus of claim 1, wherein the color filters comprise a first color filter, a second color filter, a third color filter, and a fourth color filter, and
wherein the opening portions comprise a first opening portion formed between the first color filter and the second color filter, a second opening portion formed between the second color filter and the third color filter, and a third opening portion formed between the third color filter and the fourth color filter, the fourth color filter being substantially the same as the first color filter and adjacent to the third color filter.

5. The display apparatus of claim 4, wherein each of the first color filter, the first opening portion, the second color filter, the second opening portion, the third color filter and the third opening portion has a stripe shape.

6. The display apparatus of claim 4, wherein the pixel electrodes comprise a first pixel electrode corresponding to the first color filter, a second pixel electrode corresponding to the second color filter, and a third pixel electrode corresponding to the third color filter, and
wherein the sub pixel electrodes comprise a first sub pixel electrode corresponding to the first opening portion, a second sub pixel electrode corresponding to the second opening portion, and a third sub pixel electrode corresponding to the third opening portion.

7. The display apparatus of claim 1, wherein widths of the opening portions are calculated according to a refractive index and a thickness of a material in the opposite substrate.

8. The display apparatus of claim 1, wherein the opposite substrate further comprises a common electrode formed on the color filter layer.

9. The display apparatus of claim 8, wherein the opposite substrate further comprises:
- an adhesive layer formed between the second base substrate and the color filter layer to combine the second base substrate with the color filter layer and to protect the second base substrate; and
- a polymer layer formed between the color filter layer and the common electrode so that the common electrode is prevented from being twisted.

10. The display apparatus of claim 9, wherein a width of each of the opening portions is calculated according to refractive indexes and thicknesses of the second base substrate, the adhesive layer, the color filter layer, the polymer layer and the common electrode.

11. The display apparatus of claim 10, wherein the width of each of the opening portions is between about 21 µm and about 30 µm.

12. The display apparatus of claim 1, wherein the light passing through each of the opening portions is white light.

\* \* \* \* \*